July 1, 1924.  
J. ERDEY  
1,499,356  
LOCK FOR AUTOMOBILE STEERING WHEELS  
Filed April 6, 1921    2 Sheets-Sheet 1
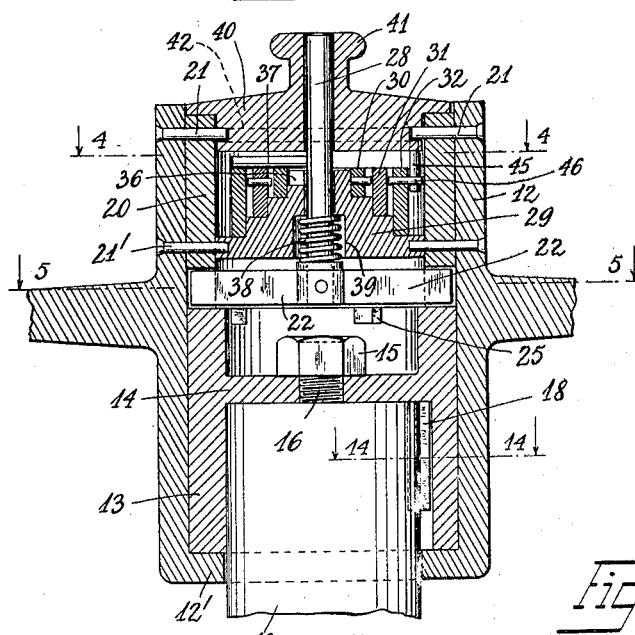
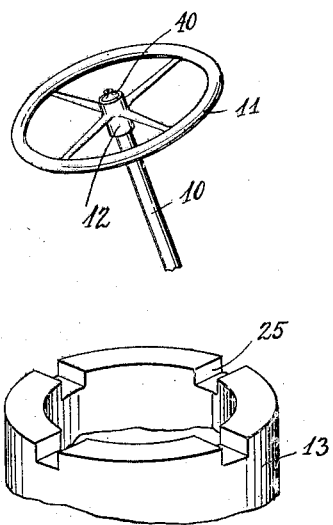
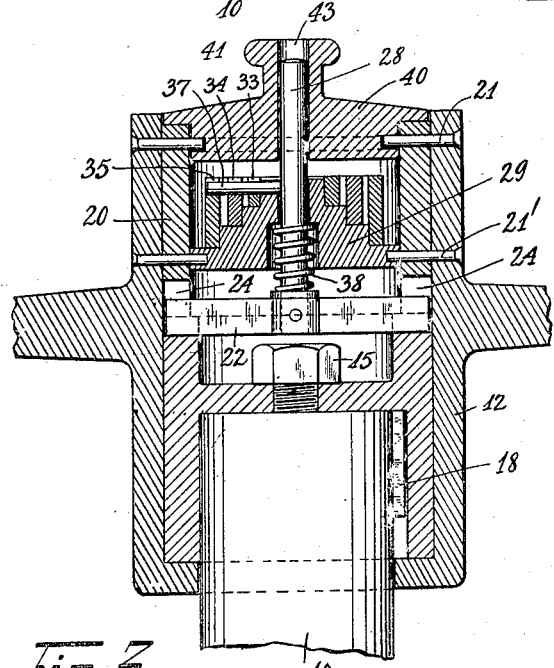
INVENTOR.  
Joseph Erdey.  
BY  
Richards Geier  
ATTORNEYS.

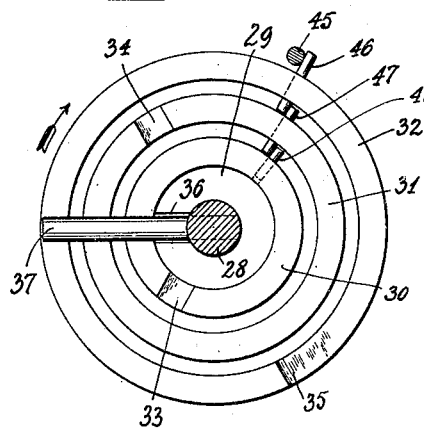
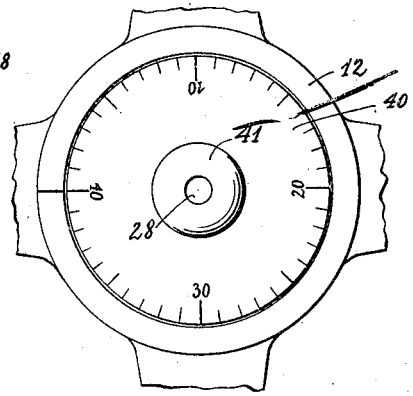
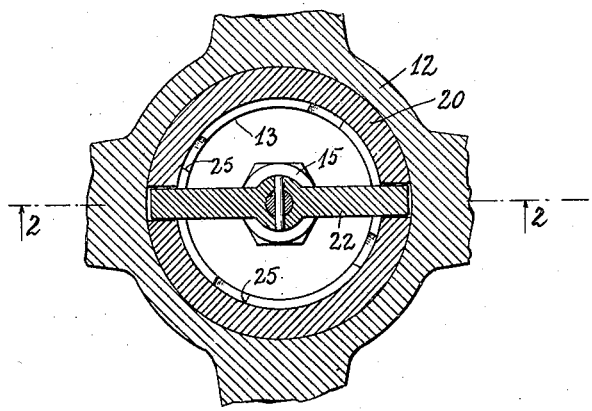
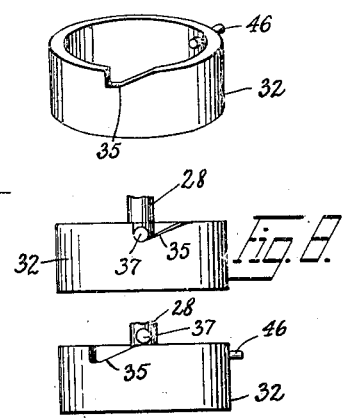
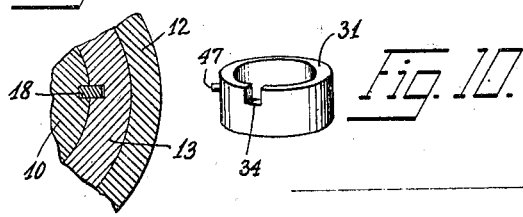

Patented July 1, 1924.

1,499,356

UNITED STATES PATENT OFFICE.

JOSEPH ERDEY, OF NEW YORK, N. Y., ASSIGNOR, BY MESNE ASSIGNMENTS, TO THE SAFELOCK CO., INC., OF CLEVELAND, OHIO, A CORPORATION OF DELAWARE.

LOCK FOR AUTOMOBILE STEERING WHEELS.

Application filed April 6, 1921. Serial No. 459,041.

*To all whom it may concern:*

Be it known that I, JOSEPH ERDEY, citizen of the Republic of Hungary, and resident of New York, in the county of New York and State of New York, have invented certain new and useful Improvements in Locks for Automobile Steering Wheels, of which the following is a specification.

This invention relates to steering wheel mounting means for automobiles, having more particular reference to a lock controlled device whereby the wheel may be released from operative engagement with the steering shaft when the automobile is left standing and re-engaged therewith by proper manipulation of the lock, the invention having for an object to provide a simple, and inexpensive device of this kind which can be readily applied to certain existing types of steering posts and which does not present projecting or unsightly parts.

For further comprehension of the invention, and of the objects and advantages thereof, reference will be had to the following description and accompanying drawings, and to the appended claims in which the various novel features of the invention are more particularly set forth.

Figure 1 of the drawings is a perspective view of a steering wheel and shaft having the invention applied thereto.

Figure 2 is a vertical sectional view showing the wheel in position on the steering shaft, showing the various parts in position in which the wheel is free to turn on the shaft, this view being taken on line 2—2 of Figure 5.

Figure 3 is a similar view but showing the wheel locked to the shaft.

Figure 4 is an enlarged horizontal section on the line 4—4 of Figure 2, omitting the outer parts.

Figure 5 is a horizontal section on the line 5—5 of Figure 2.

Figure 6 is a plan view of the wheel hub, showing the dial of the combination lock.

Figure 7 is a detail perspective view of one of the rings of the combination lock mechanism.

Figure 8 is a side view thereof, showing also a portion of the locking bar spindle.

Figure 9 is a similar view to Figure 8 but with the spindle in a different position.

Figure 10 is a detail perspective view showing another of the rings of the combination lock.

Figure 11 is a fragmentary perspective view of the sleeve fixed on the steering shaft.

Figure 12 is a fragmentary side view of the two sleeve elements adapted to be locked together to effect engagement of the wheel and shaft, the locking bar being shown in inoperative position.

Figure 13 is a similar view to Figure 12 with the locking bar in operative position.

Figure 14 is a fragmentary horizontal section on the line 14—14 of Figure 2.

In the drawings the reference numeral 10 indicates the steering shaft of an automobile. The steering wheel is indicated at 11 and is formed with an integral hub 12 whereby it is mounted on the shaft, this hub being axially elongated to provide a cylindrical casing adapted to enclose the locking mechanism.

Rigidly fixed on the upper end of the steering shaft 10 is a sleeve 13 having a transverse partition 14 a short distance below its upper end which rests on top of the shaft. Vertical displacement of the sleeve 13 is prevented by a nut 15 threaded on a screw 16 fixed on the top of shaft 10 and extending upward through a suitable opening in the partition 14. The sleeve 13 and shaft 10 may be locked together against relative rotary movement by a key 18. This sleeve 13 is enclosed within the lower half of the hub 12, which latter has an inturned flange 12' on its lower end engaging under the sleeve and preventing the wheel 11 being lifted off the shaft.

Fitted rigidly within the upper half of the hub 12 is a second sleeve 20 which is here shown as secured to the hub by upper and lower sets of rivets 21, 21', these two sleeves 13 and 20 being adapted to be locked together against relative movement by means of a horizontal bar 22 extending diametrically across the hub at the meeting point of the sleeves, this bar 22 being vertically movable to locking or unlocking position. As here shown the sleeve 20 has a pair of diametrically opposed notches 24 in its lower face in which the ends of the bar 22 engage and which are of sufficient depth to permit of the bar being raised entirely above the sleeve 13. In the top face of the latter sleeve are cut two diametrically opposed pairs of notches 25 which are of a depth of approximately one-half that of the bar 22, so that the latter, when lowered into these notches also remains in engagement with the notches 24 and thus locks the two sleeves against relative rotation.

The adjustment of the bar vertically between locking and releasing positions is preferably controlled by a combination lock device carried in the upper end of the hub. As here shown the bar is fixed on the lower end of a spindle 28 which extends freely upwardly through a stepped disk 29 rigidly fixed within the lower part of the sleeve 20. Loosely seating on the steps of the disk 29 are a series of concentric rings of which there are three here shown, numbered respectively 30, 31 and 32, the top edges of these rings being in a common plane with the top of the disk 29, and being formed with notches 33, 34 and 35, respectively, while the disk 29 is also notched as at 36. Fixed to the spindle 28, and projecting horizontally over these rings, is a pin 37 whereby the vertical movement of the spindle, and in consequence of bar 22, is controlled. The bar 22 is normally urged toward the sleeve 13 by a coiled expansion spring 38 surrounding the spindle 28 and accommodated in a socket 39 in the lower side of disk 29.

Mounted to rotate freely on the top of the sleeve is a dial number 40 provided with the usual knob 41 for turning purposes, this dial being here shown as held against axial displacement by the inner ends of the upper set of rivets 21 which engage freely in a peripheral groove 42 therein. Extending through the dial 40 and knob 41 is an aperture 43 in which the upper end of the spindle 28 is accommodated freely. Projecting downwardly from the bottom of the dial 40 is a pin 45 which projects between the outer ring 32 and the inner wall of sleeve 20 into the path of a pin 46 carried in said ring and projecting both inwardly and outwardly therefrom. Projecting both inwardly and outwardly from the intermediate rings 31 is a second pin 47, while a third pin 48 projects outwardly from the inner ring 30, these pins all lying in a common horizontal plane.

By proper manipulation of the dial 40 the notches 33, 34 and 35 may all be brought into alinement with the pin 37, allowing the bar 22 to fall to locking position, the manner of manipulating the dial being briefly as follows:

The dial 40 will be rotated in the direction of the arrow in Figure 4 a sufficient number of times to bring the parts into the position shown and will then be moved in the same direction until notch 33 registers with pin 37. The dial is then rotated in an opposite direction, making two revolutions before the pin 46 on the outer ring 32 reengages the pin 47 on the intermediate ring 31, this movement being continued until notch 34 registers with pin 37. The dial is then rotated in an opposite direction, making one revolution before pin 45 thereon engages the pin 46 on the outer ring 32, the movement being continued until the notch 35 registers with the pin 37. If the bar 22 is then in registry with either pair of notches 25 in the lower sleeve 13 it drops thereinto, or if not in registry the wheel 11 is turned until the bar drops into the notches and locks the wheel to the shaft. To enable the wheel to be released one wall of notch 35 is beveled or inclined as shown and upon the dial being turned in the direction of the arrow the pin 37 is caused to ride up the cam wall of notch 35, the rotation of the dial being continued sufficiently to move the notches 33 and 34 out of their registering positions. The lifting of pin 37 as it rides up the cam wall of notch 35 will disengage bar 22 from sleeve 13, leaving the wheel 11 free on the shaft 10.

Having thus described my invention what I claim as new and desire to protect by Letters Patent of the United States is as follows:—

1. In a vehicle, a solid steering shaft, a steering wheel having a hollow hub, means to operatively connect said wheel and shaft, a permutation lock to control the connecting means comprising a plurality of rotatable concentrically arranged rings completely enclosed within said hub, said connecting means and lock entirely enclosed within said hub a single operating dial for said lock, said dial completely closing the upper end of said hollow hub, means for connecting said dial to one of said rings and lost motion interconnecting means between said rings.

2. In a vehicle, a steering shaft, a sleeve fixed to the top of said shaft, a steering wheel having a hub loosely enclosing said sleeve and projecting axially therebeyond to provide a lock casing, a second sleeve fixed in the said projecting portion of the hub, said sleeves having co-acting notches in their adjacent ends, a bar extending diametrically across the hub and adapted to engage at its ends in the said notches, the notches in the second sleeve being of sufficient depth to permit of the bar being raised to clear the end of the first sleeve, the notches in the first sleeve being of less depth, a spindle extending axially of the hub and fixed to said bar, a spring normally urging said bar toward the first sleeve, and combination lock mechanism adapted to hold said spindle in position with the said bar clear of the notches in the first sleeve.

3. In a vehicle, a steering shaft, a sleeve fixed to the top of said shaft, a steering wheel having a hub loosely enclosing said sleeve and projecting axially therebeyond to provide a lock casing, a second sleeve fixed in the said projecting portion of the hub, said sleeves having co-acting notches in their adjacent ends, a bar extending diametrically across the hub and adapted to engage at its ends in the said notches, the notches in the second sleeve being of sufficient depth to permit of the bar being raised to clear the end of the first sleeve, the notches in the first sleeve being of less depth, a spindle extending axially of the hub and fixed to said bar a spring normally urging said bar toward the first sleeve, and combination lock mechanism adapted to hold said spindle in position with the said bar clear of the notches in the first sleeve, said lock mechanism including a dial element closing the end of said hub.

4. In a vehicle, a steering shaft, a steering wheel having a hub loose on said shaft, a movable element in said hub adapted to lock said hub to said shaft, a stepped disk in said hub above said element, a series of concentric rings rotatable on said disk, said rings having their upper faces in a common plane, and each formed with a notch, a spindle fixed to said element and extending upwardly through said stepped disk, a pin projecting from said spindle over the upper faces of the said rings, a spring acting on said spindle to urge said pin against said rings, a dial swiveled in and closing the upper end of said hub, and pins on said dial and rings for alining the notches in the latter.

5. In a vehicle, a steering shaft, a steering wheel, a permutation locking device to render said wheel operative or inoperative comprising a disk having a plurality of concentric annular grooves therein, a series of concentric rings rotatably mounted in said grooves, said rings having their outer faces in a common plane and each formed with a notch, a locking spindle, axially arranged within and longitudinally movable of said rings, a pin projecting radially outward from said spindle across said rings, a spring to normally hold said pin in engagement with the outer faces of said rings, a dial, interengaging means between said dial and one of said rings, interengaging means having lost motion movement interposed between each of said rings whereby all of said rings may be set by said dial to aline said notches and permit said spring to cause longitudinal movement of said spindle in one direction and one of said rings being provided with a cam surface to cause longitudinal movement of said spindle in the opposite direction.

Signed at New York in the county of New York and State of New York this 30 day of March A. D. 1921.

JOSEPH ERDEY.